United States Patent [19]
Asano et al.

[11] 3,817,344
[45] June 18, 1974

[54] APPARATUS FOR CONTROLLING VEHICULAR SPEED AND INTERSPACING

[75] Inventors: Tetsumasa Asano; Hiroshi Takamiya; Yoshinobu Morimoto, all of Himeji, Japan

[73] Assignee: Mitsubishi Denki Kabushiki Kaisha, Tokyo, Japan

[22] Filed: Sept. 25, 1972

[21] Appl. No.: 292,104

[30] Foreign Application Priority Data
Sept. 23, 1971 Japan.............................. 46-74310
Oct. 23, 1971 Japan.............................. 46-84200
Oct. 29, 1971 Japan.............................. 46-86128
Oct. 28, 1971 Japan.............................. 46-85859
Oct. 28, 1971 Japan.............................. 46-85858

[52] U.S. Cl....................... 180/98, 318/587, 340/33
[51] Int. Cl............................................... B60t 7/18
[58] Field of Search................. 180/98; 340/32, 33; 318/587

[56] References Cited
UNITED STATES PATENTS
3,078,944  2/1963  Gray..................................... 180/98
3,668,624  6/1972  Spaulding.............................. 180/98

*Primary Examiner*—Robert B. Reeves
*Assistant Examiner*—Thomas E. Kocovsky
*Attorney, Agent, or Firm*—Oblon, Fisher, Spivak, McClelland & Maier

[57] ABSTRACT

A fail-safe system, having both digital and analog embodiments, which controls the spacing and speed of vehicles traveling along a prescribed track, path or roadway. In accordance with the system, the position of a particular vehicle is detected by ground mounted elements which sense the passage of a vehicle. This information is retained in a memory until it is erased by the passing of a subsequent vehicle. In addition, information as to the position of the vehicle is transmitted back along the track over a suitable circuit network to following vehicles to regulate the speed and spacing of all vehicles running on the same track. The system also provides for high speed and low speed zones, and for junction zones between the high and low speed zones.

10 Claims, 8 Drawing Figures

3,817,344

APPARATUS FOR CONTROLLING VEHICULAR SPEED AND INTERSPACING

BACKGROUND OF THE INVENTION

1. Field Of The Invention

The present invention relates generally to a system and apparatus for controlling vehicles and more particularly to a system and apparatus for automatically controlling the speed and relative spacing of a plurality of separate vehicles moving along a prescribed path or track.

2. Description Of The Prior Art

Heretofore, automatic block controlling systems have been widely used for tracked vehicles, such as railroad vehicles. In such conventional systems locating of the forward or lead vehicle has been accomplished by utilizing the fact that two rails are electrically short-circuited by the wheels of the forward vehicle. This system is quite safe and reliable, especially when many cars are joined together and many wheels are on the two rails, since a short-circuit path is then formed even when some of the cars become derailed, since other cars generally remain on the two rails.

However, it is impossible to apply this system, which requires conductive rails, to other non-railroad vehicles and cars and to non-joined railroad cars which run on a track with rubber tire wheels. Thus a new type of control apparatus or system is needed for controlling these and other types of vehicles which do not run on conductive rails or do not run on conductive wheels, or both.

SUMMARY OF THE INVENTION

Accordingly, one object of this invention is to provide a novel system for controlling the speed and relative spacing of a plurality of separate vehicles traveling along a prescribed track or path.

Another object of the present invention is to provide an automatic control system for vehicles which does not require conductive rails.

A still further object of the present invention is the provision of a fail-safe system for controlling the movement of separate vehicles along a prescribed track or path.

Yet another object of the present invention is the provision of unique circuitry for automatically controlling the movement of separate vehicles along a prescribed track or path.

Briefly, these and other objects of the present invention are achieved by providing a series of detector elements at selected intervals along the path or track. These elements sense the passage of a vehicle and include memory devices for retaining information regarding the passage of a vehicle. This information is supplied to following vehicles in the form of a voltage having a magnitude proportional to the distance between vehicles. This voltage signal is used to control the speed of the following vehicles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The apparatus of the present invention, which provides a fail-safe control system suitable for use with passenger cars or trucks operating either in cities or on the highway as well as with vehicles for transferring cargo within a factory and with all types of rail vehicles, is based on the following basic considerations. First, a following car should run while receiving a signal from a leading car such that the following car can safely stop either because of the failure of signal transmission from the forward car or because of the failure of signal reception at the following car. In such a system, however, a car cannot run without a leading car. Second, to eliminate the need for a leading car, a memory system should be used. The memory system can be used to store the signals transmitted from the leading car, when a leading car exists, but can also be used to store control signals generated by other means. Third, a following car should run erasing memorized information produced by a leading car, and should transmit new information to cars behind it. In this transmission-reception system, a new signal is not transmitted to a following car when the memorized signal of the leading car is not erased. This system is effective in preventing a rear-end collision when the following car fails to erase the memorized information generated by the leading car.

Figure 1:
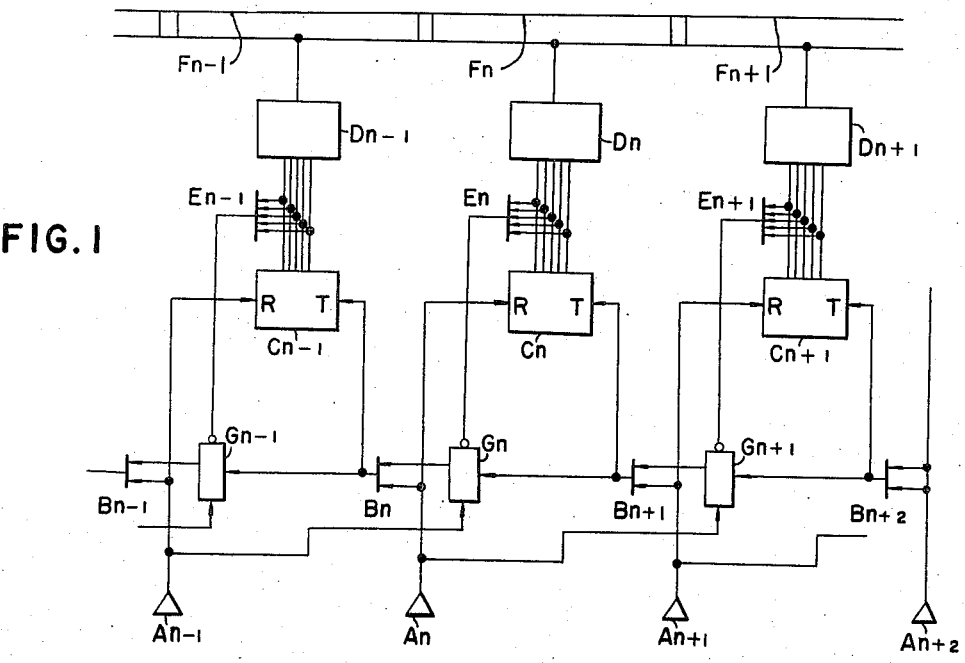
FIG. 1 is a schematic diagram of one embodiment of an apparatus for controlling a car in accordance with this invention.

Referring now to the drawings, wherein like reference numerals designate identical or corresponding parts throughout the several views, and more particularly to FIG. 1 thereof, one embodiment of the apparatus for controlling the car in accordance with this invention is shown, wherein $A_n$ designates a ground element, such as a magnetic semiconductor proximity switch placed at a specific interval along a track, path or roadway. Similarly, the letter $B_n$ designates an OR gate generating a theoretical sum output on reception of signals from the ground element $A_n$, or on reception of an output signal from a gate $G_n$. The letter $C_n$ designates a counter wherein the counter input T is the output signal of the OR gate $B_{n+1}$, and the counter reset input R is the reception signal of the ground element $A_n$. The letter $E_n$ designates an OR gate having an input for each output bit of the counter $C_n$. The letter $G_n$ designates a gate controlled by the output of the OR gate $E_n$ and the reception signal of the ground element $A_{n-1}$, whereby the output of the OR gate $E_n$ is zero after receiving the signal from the ground element $A_{n-1}$, and the output of the OR gate $B_{n+1}$ is not transmitted to the OR gate $B_n$ until a new output is provided. The letter $D_n$ designates a digital-to-analog or DA converter having as an input each output bit from the counter $C_n$. The letter $F_n$ designates a conductive segment on which the output voltage of the DA converter is impressed. A plurality of conductive segments $F_{n-1}, F_n, F_{n+1} \ldots$ are respectively insulated from one another and arranged in one line along a prescribed path, track or roadway.

Figure 2:
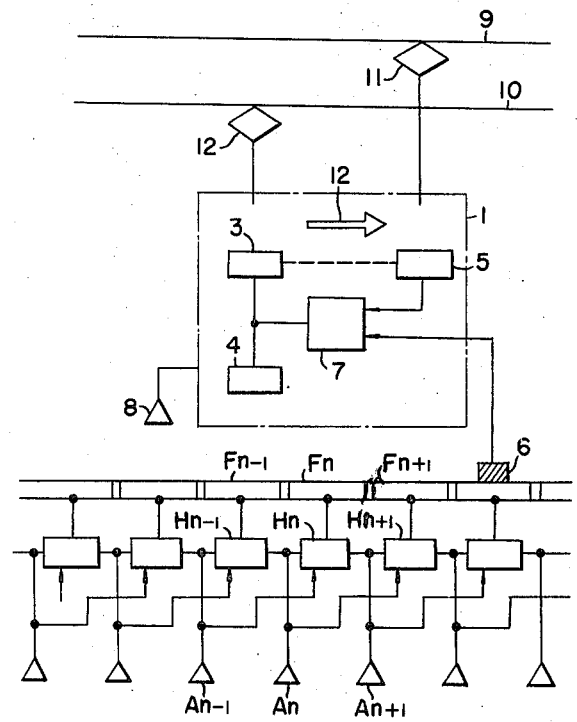
FIG. 2 is a schematic illustration of the control system of the present invention employing the apparatus for controlling a car illustrated in FIG. 1.

FIG. 2 shows a schematic diagram of the control system of the present invention wherein $H_n$ designates a memory device consisting of the OR gate $B_n$, the gate $G_n$, the counter $C_n$, the OR gate $E_n$ and the DA converter $D_n$. The reference numeral 1 designates a car running in the direction of an arrow 2 on a track, path or roadway not shown in drawing. A driving device 3 and a damper or brake 4 are also shown. The numeral 5 designates a speed dynamo, while 6 designates a receiver on the car 1 which is fitted in front of the car so as to respectively contact and sense the signal voltage of the conductive segments $F_i$ ($i = 1, 2 \ldots, n-1, n, n+1 \ldots$). The numeral 7 designates a speed controlling device for comparing the voltage sensed by the receiver 6 with the output voltage of the speed dynamo 5, and for controlling the driving device 3 and the damper 4 so as to cause the car 1 to move at a speed corresponding to the voltage sensed by the receiver 6. The numeral 8 designates a car element, such as metal piece fitted on back of the car 1, designed to pass in close proximity to the ground elements $A_i$ ($i = 1, 2 \ldots$), respectively. Similarly, the numerals 9 and 10 designate power lines, while 11 and 12 designate current collectors connected to the power lines.

In the above described system, when the car 1 runs so that the car element 8 approaches the ground element $A_{n-1}$ and comes into juxtaposition with it, the ground element $A_{n-1}$ detects this fact and generates a reception signal indicating the passage of the car. The gate $G_n$ is closed by the reception signal and the counter $C_{n-1}$ is reset so that the output of the OR gate $E_{n-1}$ is zero. Accordingly, the signal passing from the OR gate $B_{n+1}$ through the gate $G_n$, the OR gate $B_n$ and the gate $G_{n-1}$ to the OR gate $B_{n-1}$, is shut off or stopped by the gate $G_{n-1}$ and the gate $G_n$. When the car element 8 faces the ground element $A_n$ as the car passes, the reception signal of the ground element $A_n$ is passed through the OR gate $B_n$ so as to drive the counter $C_{n-1}$, and the gate $G_{n-1}$ is opened by generation of output of the counter $C_{n-1}$. Accordingly, the reception signal of the ground element $A_n$ is passed through the gate $G_{n-1}$ and the OR gate $B_{n-1}$ so as to continuously drive the counters located behind the moving car. The reception signal from the ground element $A_n$ also resets the counter $C_n$, and the gate $G_{n+1}$ is thus closed.

As the car element 8 moves forward, the output of a counter $C_i$ corresponding to a ground element $A_i$ is zero and the voltage impressed on a conductive segment $F_i$, which is an analogue-converted signal, is zero. The counters behind the counter $C_i$ respectively have outputs successively one count higher depending upon the distance from the moving car. The states of the counters are represented in FIG. 3.

Figure 3:
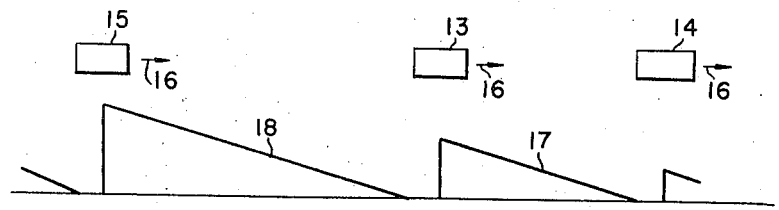
FIG. 3 is a graphical illustration of the operating characteristics of the control system of FIG. 2.

Referring now to FIG. 3, a lead car 14, a following car 13 and a rear car 15 are illustrated. When the lead car 14, the following car 13 and the rear car 15 run in the direction of an arrow 16, the voltage of the conductive segments $F_i$ placed between the cars increases depending upon the distance between the cars as shown by the reference numerals 17 and 18.

Figure 4:
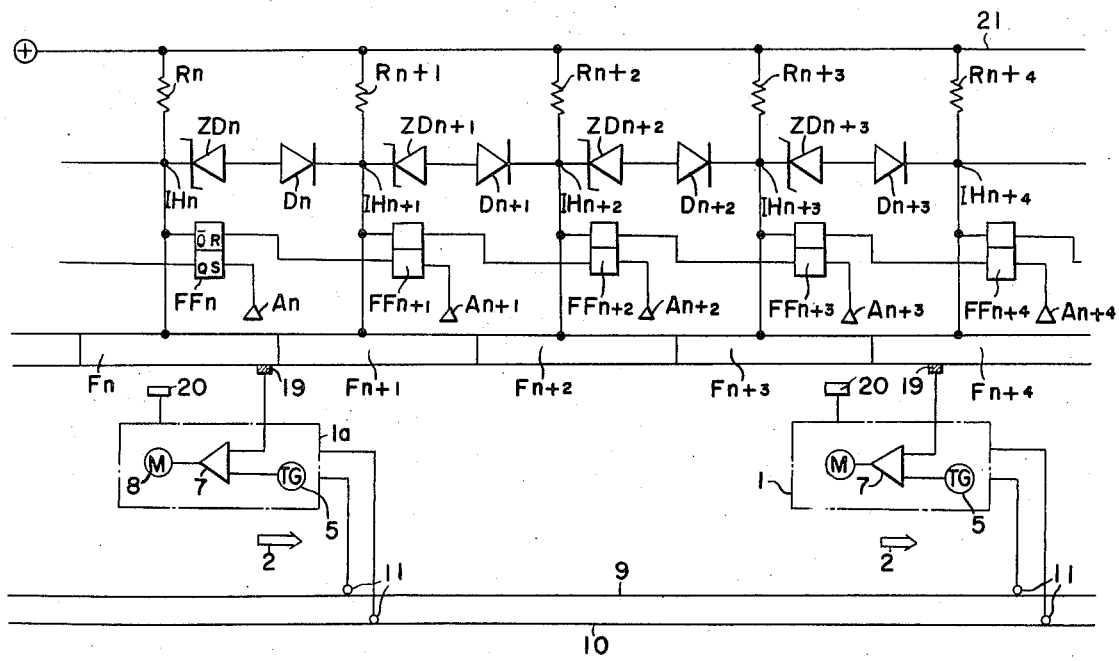
FIGS. 4, 5, 6, 7 and 8 are respectively schematic illustrations similar to that of FIG. 2 of various different embodiments of the control system in accordance with this invention.

FIG. 4 illustrates another embodiment of the apparatus for controlling a car wherein the reference numeral 1 again designates a forward or leading car and 1a designates a rear or following car. The numeral 19 designates a moving brush contacting the conductive segments $F_x x = 1, 2, 3 \ldots n$, and the numeral 20 designates a car element equivalent to the car element 8 previously described. The numeral 21 designates a feed line while $IH_n$ designates a connecting point. Similarly, $D_x$ designates a diode and $ZD_x$ designates a zener diode, while $FF_x$ designates a flip-flop having a set circuit S and a reset circuit R. The flip-flop $FF_x$ is reset by signals from the ground element $A_x$, and makes a short circuit to a source of negative potential, such as an earth or ground potential at the point connected to the conductive segment $F_x$, a resistor $R_x$, the diode $D_x$ and the anode of zener diode $ZD_x$. Each flip-flop is also connected to the reset circuit of the flip-flop behind it.

In this embodiment of the apparatus of the present invention, when the car runs, the ground element $A_{n+3}$ faces the car element 20 of the forward car 1, generating an output indicating the position of the car. The flip-flop F $F_{n+3}$ is set and its output side is at earth potential, as are the resistance $R_{n+3}$, the diode $D_{n+2}$, the anode of the zener diode $ZD_{n+3}$ and the conductive segment $F_{n+3}$, which are connected to the contact point $IH_{n+3}$.

On the other hand, at the contact point $IH_{n+4}$ which is located 1 block or 1 unit in front of the output of $FF_{n+3}$, the potential is high because of the reset condition of the flip-flop F $F_{n+4}$. However, no current is supplied from the front or forward direction because of the insertion of diode $D_{n+3}$. On the other hand, at the contact $IH_{n+2}$ which is placed 1 block or 1 unit behind the contact $IH_{n+3}$ which is at earth potential, the output side of the flip-flop is at a high potential because the flip-flop F $F_{n+2}$ connected to the contact $IH_{n+2}$ is reset by the output of the flip-flop F $F_{n+3}$. If the forward direction voltage drop is disregarded, a voltage corresponding to the zener voltage $V_z$ of the zener diode $ZD_{n+2}$ is impressed at this point. As a result, at the conductive segment $F_{n+2}$ located 1 block or 1 unit behind the lead car 1, the additional zener voltage $V_z$ is impressed. Accordingly, the voltage impressed on the conductive segment $F_x$ located n blocks or units behind the lead car 1, becomes $nV_z$. Thus the voltage impressed on each of the conductive segments F is proportional to the distance to the lead car. The following car 1a receives the voltage $nV_z$, which is proportional to the distance to the forward car 1 through the brush 19. The control device 7 regulates a motor M so as to regulate the speed of car by comparing the output of the speed dynamo or detector 5 with the signal from the brush 19.

As stated above, as the rear flip-flop is reset, by setting the forward flip-flop, information concerning the presence of a car is communicated without failure. When any defect or accident occurs, the rear or following cars are gradually stopped to form a fail-safe system.

Figure 5:
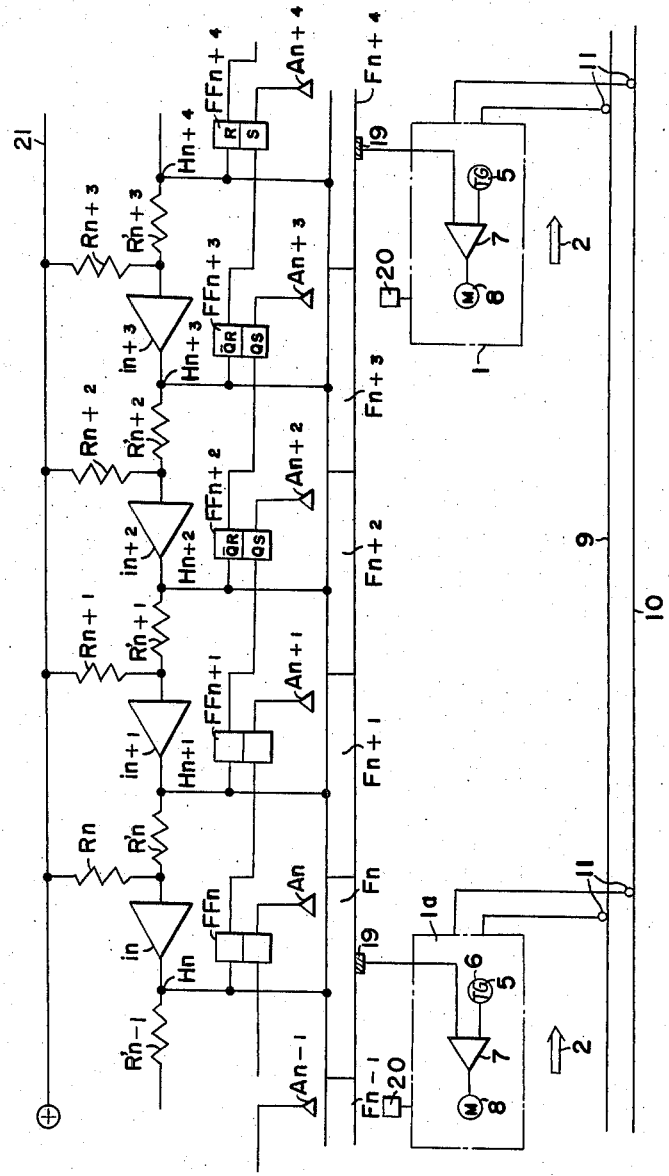

FIG. 5 illustrates another embodiment of the apparatus of the present invention wherein $R_x$ designates an addition resistor for adding the reference power supplied from the feed line 21 and $i_x$ designates a coupler or coupling amplifier while $R'_x$ designates a resistor inserted between the couplers $i_x$ for transmitting the output of a forward coupler to the rear as the input for a rear coupler.

In the embodiment of FIG. 5, the ground element $A_{n+3}$ faces the car element 20 of the forward car 1, and generates the output indicating the position of the car. The flip-flop F $F_{n+3}$ is set by this output and the output side thereof is at earth potential. Accordingly the output of the coupler $i_{n+3}$ connected to the contact point $IH_{n+3}$ at the output side of the flip-flop F $F_{n+3}$ is forcibly dropped to earth potential. Accordingly, the input to the coupler $i_{n+2}$ is only $V_s$, that is, the reference voltage $V_s$. Consequently, the output of the coupler $i_{n+2}$ becomes $V_s$. On the other hand, the flip-flop $FF_{n+2}$ is reset by the output of the flip-flop F $F_{n+3}$ and the output thereof is at a high potential. Accordingly, the input to the coupler $i_{n+1}$ is the output $V_s$ of the coupler $i_{n+2}$ plus the reference power $V_s$, so that the total output of the coupler $i_{n+2}$ is $2V_s$. In the same situation, the voltage impressed on the rear conductive segment $F_n$, separated by n blocks or units from the ground element $A_{n+3}$ is $nV_s$. Consequently, the voltage impressed on each conductive segment $F_x$ is proportional to the distance from the lead car, and the system operates in the manner illustrated in FIG. 3.

It should be noted that the voltage $V_z$ of the zener diode in FIG. 4 and the voltage impressed on the resistance $R_n$ in FIG. 5 are respectively proportional to the length of the conductive segment $F_n$. This length can be changed to any desirable length depending upon the conditions of the track or path. For example, the length of the conductive segment in each detecting unit may be shortened for increasing accuracy of the car separation distance measurement near crossings or near loading and unloading platforms where low speed and dense running conditions are required. Similarly, longer conductive segments may be employed in high speed track areas where the cars are widely separated in order to decrease the cost of the system.

In order to attain dense running conditions in certain areas, the track may thus be divided into high speed running zones and the low speed running zones. The ground elements for detecting the passing cars are placed at different intervals depending upon whether a high speed zone or a low speed zone is desired, whereby larger car spacing distances are provided in high speed zones while shorter car spacing distances are provided in low speed zones.

Figure 6:
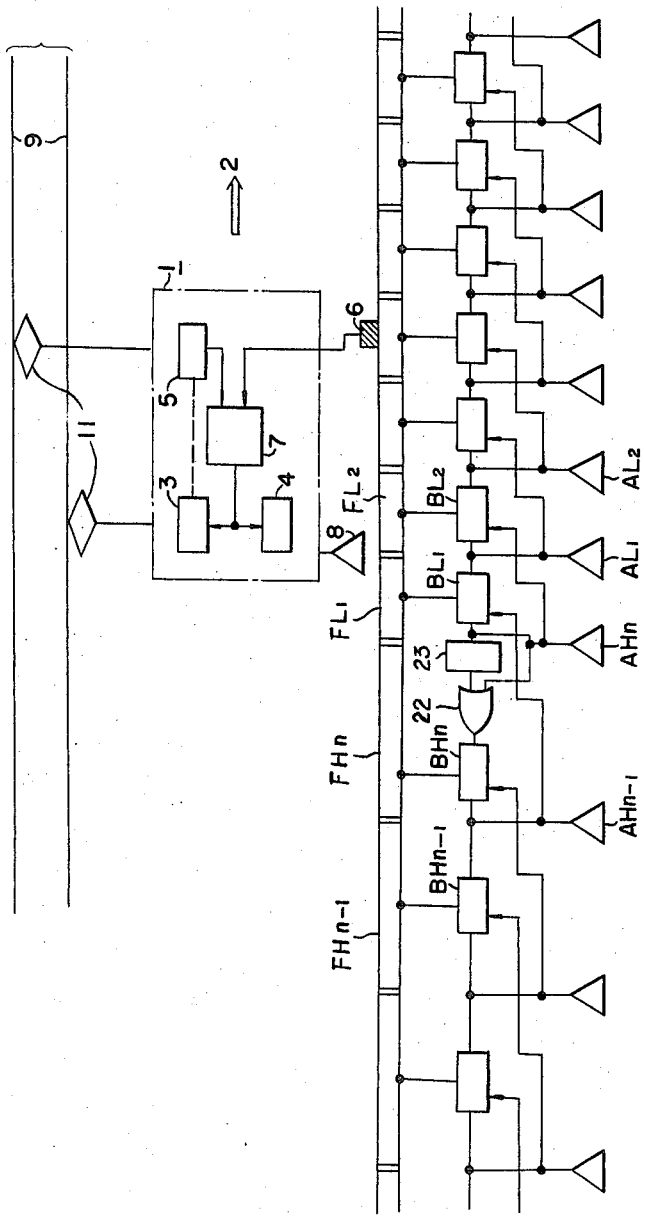

Another embodiment of the present invention is shown in FIG. 6, wherein $AL_n$ designates a ground element in a low speed zone while $AH_n$ designates a ground element in a high speed zone. The ground elements $AH_n$ are placed with twice the spacing of the elements $ALn$. Similarly, $BL_n$ designates an output voltage controlling device placed corresponding to the ground element $AL_n$ in the low speed zone and $BH_n$ designates an output voltage controlling device placed corresponding to the ground element $AH_n$ in the high speed zone. It will be understood, of course, that the output voltage controlling devices may be circuits of the type described above with reference to FIGS. 1-5. In addition $FL_n$ designates a conductive segment in the low speed zone, on which the output voltage of the output voltage controlling device $BL_n$ is impressed, and $FH_n$ designates a conductive segment in the high speed zone, on which the output voltage of the output voltage controlling device $BH_n$ is impressed. The length of each of the segments in the high speed zone is twice the length of each of the segments in the low speed zone. The conductive segments $FL_n$ and $FH_n$ are respectively insulated from each other and arranged in a continuous line.

In FIG. 6, the reference numeral 23 designates a scale of two divider. This device is used when the output voltage controlling devices are the circuits illustrated in FIG. 1. The scale of two divider is necessary since the ground elements $AH_n$ are separated by twice the interval of the ground elements $AL_n$. Accordingly, the counter output of the first output voltage controlling device $BL_1$ at the beginning of the low speed zone must be decreased to one-half of its normal value so that the correct output is transmitted through an OR gate 22 to the final output controlling device $BH_n$ of the high speed zone.

The operation of the above described apparatus will now be described in more detail. When the car is running so that the car element 8 faces the ground element $AH_{n-1}$, the ground element $AH_{n-1}$ detects the presence of the car and the signal indicating a passing car is generated. The output of the output voltage controlling device $BL_1$ is held constant by this signal, and the output voltage controlling device $BH_n$ is reset. In addition, an input is provided to the counters located behind the output voltage controlling device $BH_{n-1}$. When the car moves so that the car element 8 faces the ground element $AH_n$, the output of the output voltage controlling device $BL_2$ is held constant and the output voltage controlling device $BL_1$ is reset, while an input is continuously provided through the OR gate 22 to the counters behind the output voltage controlling device $BH_n$. As the car element 8 continues to move, the next sequential output voltage controlling device corresponding to the next ground element is reset. The counters behind the output voltage controlling device corresponding to each ground element, have outputs progressively 1 count higher corresponding to the distance from the car, as described previously. The counters apply progressively higher voltages to the conductive segments placed along the track, and the car 1 receiving the voltage signals from the car element 8, runs at a speed corresponding to the received voltage. The output voltage controlling devices $BH_{n-1}$ and $BH_n$ in the high speed zone are connected through the scale of two divider device 23 to the output voltage controlling devices $BL_1$, $BL_2$.

As stated above, the ground elements $AH_{n-1}$ $AH_n$ in the high speed zone are placed at twice the interval of the ground elements $AL_1$ and $AL_2$ in the low speed zone. If the car moves from the high speed zone to the low speed zone, the number of the ground elements facing the car element 8 in the low speed zone is twice that of the high speed zone. However, the counter output of the first output voltage controlling device $BL_1$ in the low speed zone is decreased by one-half by the scale of two divider 23. Accordingly, an input corresponding to the scale in the high speed zone is provided to the output voltage controlling device $BH_n$. Thus even if one car is in the high speed zone, and a forward car is in the low speed zone, the output voltage controlling device in the high speed zone can obtain an accurately scaled input to safely control all traffic.

As stated above, in the present embodiment, the track is divided into a low speed zone and a high speed zone, and the number of the ground elements placed within a specific distance is decreased in the high speed zone. Accordingly, the total cost of the apparatus can be decreased.

Figure 7:
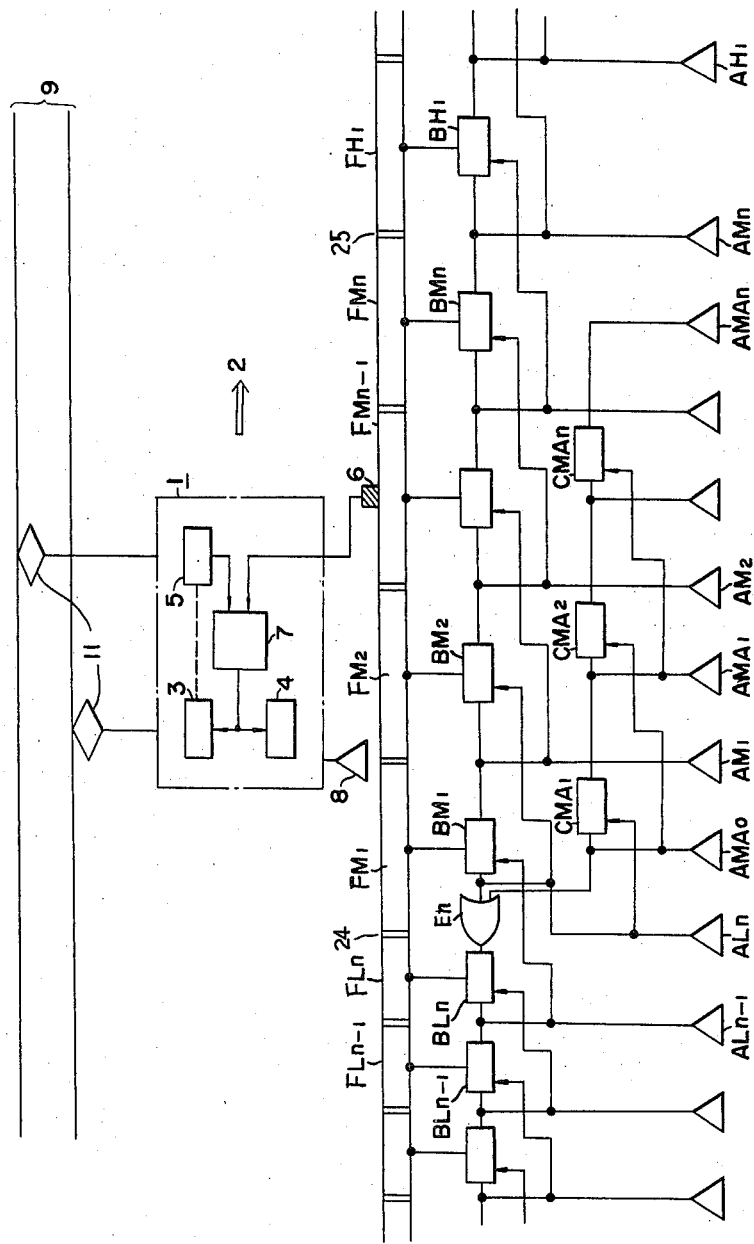

Another embodiment, which is an improvement of the FIG. 6 embodiment, and has an auxiliary device at the junction between the low speed zone and the high speed zone for improving control at the junction, is shown in FIG. 7. In FIG. 7, $AM_n$ designates a ground element placed at the junction between the low speed zone and the high speed zone and $AMA_0 \ldots AMA_n$ respectively designate auxiliary ground elements (such as magnetic proximity switches) placed at the junction. In addition, $AL_n$ designates a ground element in the low speed zone while $AH_1$ designates a ground element in the high speed zone. Similarly $AM_1$ and $AM_2 \ldots AM_{n+1}$ and $AM_n$ designate ground elements in the intermediate or junction zone. The auxiliary and main ground elements $AL_{n+1}$, $AL_n$, $AMA_0$, $AM_1$, $AMA_1 \ldots AMA_n$, $AM_n$ are placed equal distances apart. The reference characters $BM_1 \ldots BM_n$ designate output voltage controlling devices placed in the intermediate or junction zone between the low speed zone to the high speed zone, and provide output voltages proportional to the distance between the cars. The reference characters $FM_1 \ldots FM_n$ designate the conductive segments in the junction between the low speed zone to the high speed zone and $CMA_1 \ldots CMA_n$ designate count controlling devices for counting the signals received by the ground elements $AMA_0 \ldots AMA_n$ in the junction between the low speed zone to the high speed zone. The numeral 24 designates the boarder line from the low speed zone to the junction speed zone, and 25 designates the boarder line from the junction speed zone to the high speed zone.

The operation of the above described embodiment will be explained in detail. When the car element 8 faces the ground element $AL_{n-1}$, the ground element $AL_{n-1}$ detects it and generates a car position signal so that the output of the output voltage controlling device $BM_1$ is kept at a constant value. The car position signal also resets the output voltage controlling device $BL_n$, and an input is continuously provided to the counters behind the output voltage controlling device $BL_{n-1}$.

When the car element 8 faces the ground element $AL_n$, the output of the output controlling device $BM_2$ and the counter controlling device $CMA_1$ are kept at a constant value by recept of the signal from the ground element $AL_n$ and the output controlling device $BM_1$ is reset, while an output is provided through an OR gate $E_n$ to the counter of the output voltage controlling device $BL_n$.

As the car element 8 is moved, the output of the next output voltage controlling device and the output of the counter of the count controlling device are zero, and the voltage impressed on the conductive segment connected to the output voltage controlling device, which generates an output voltage corresponding to the output of the counter, is also zero.

The counters behind the output voltage controlling device and the count controlling device having a zero output value, have an output 1 count higher corresponding to the distance behind the car. Accordingly, the voltage of the output voltage controlling device generating an output corresponding to the counter output is increased depending upon the distance between cars. However, the system prevents the output voltage from being increased above a specific value, even through the car space distance is increased beyond the corresponding specific distance. The specific car spacing for limiting the maximum voltage is substantially the same as the width of the junction zone from the boarder 24 to the boarder 25 in this embodiment.

In the junction zone the main ground elements $AM_1 \ldots AM_n$, the output voltage controlling devices $BM_1 \ldots BM_n$, the auxiliary ground elements $AMA_1 \ldots AMA_n$ and the count controlling devices $CMA_1 \ldots CMA_n$ are provided for the following reasons. When a following car is in the low speed zone, and a lead car is in the junction zone, the following car should run with an output voltage proportional to the number of the ground elements in the low speed zone until the car reaches to the junction zone. Accordingly, if the ground elements in the junction zone are placed at twice the interval of those in the low speed zone, a counter output corresponding to the number of the ground elements is supplied through the OR gate $E_n$ to the counter of the output voltage controlling device $BL_n$. The valve of this output is half of the valve corresponding to the distance in the low speed zone. The auxiliary ground elements $AMA_1 \ldots AMA_n$ and the count controlling devices $CMA_1 \ldots CMA_n$, are provided so that the number of the auxiliary ground elements passed in the junction zone may be counted to calibrate movement of the cars through the junction zone. The operation of the auxiliary ground elements $AMA_1 \ldots AMA_n$ for the calibration, is same as that of the main ground elements. The count controlling devices $CMA_1 \ldots CMA_n$ operate to count and store the signals received by the auxiliary ground elements. The outputs of the final auxiliary ground element $AMA_0$ and the count controlling device $CMA_1$ are supplied through the OR gate $E_n$ to the counter of the output voltage controlling device $BL_n$.

When a following car is in the low speed zone, and a lead car is in the high speed zone, and the car spacing distance is more than the specific distance, the output is set at the maximum voltage. Accordingly, it is unnecessary to calibrate by using the auxiliary ground elements and the count controlling device. When the lead car and the following car are in the junction zone, or the following car is in the junction zone and the lead car is in the high speed zone, it is unnecessary to use the auxiliary devices, because control can be maintained using only the main ground elements $AM_1 \ldots AM_n$, $AH_1 \ldots$ which are placed at long intervals. Suitable output voltages are impressed on each of the conductive segments, so that the car 1 receives the signal voltage from each conductive segment through the receiver 6, and the car can run at a speed corresponding to the received signal voltage.

As stated above, the apparatus can be constructed at low cost by providing short intervals between the ground elements only in the low speed, dense running zones and long intervals in high speed, low density zones.

Figure 8:
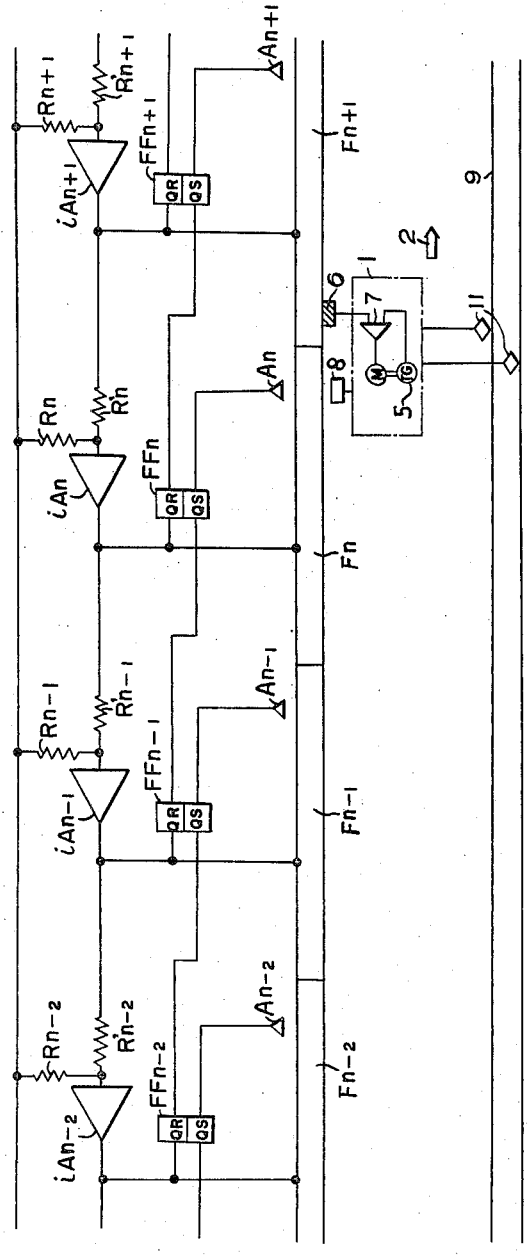

FIG. 8 shows another embodiment of the apparatus of this invention. The operation of the apparatus shown in FIG. 8 is substantially the same as that of FIG. 5. However, when it is unnecessary to closely space the ground elements as in the country or the suburbs, etc., it is necessary to continuously provide the car 1 with speed instructions over conductive segments $F_n$ having a length that is substantially longer than the car 1. The embodiment of FIG. 8 is effective in such situations. When the ground element $A_n$ is provided at the center of the conductive segment $F_n$, the voltage impressed on the conductive segment may be erased upon the reception of the signal. Accordingly, the ground element should be placed so as not to erase the voltage impressed on the conductive segment receiving the speed instruction signal as the receiver 6 of the car 1 passes from the conductive segment $F_n$ to the next conductive segment. Accordingly, the distance from the ground element $A_n$ to the end of the next conductive segment $F_n$ should be shorter than the distance between the receiver 6 and the car element 8. In the embodiment of FIG. 8, the ground elements are placed in this relationship. In FIG. 8, the car element 8 is fitted behind the receiver 6. However it is possible to reverse the positions of the brush 6 and the car element 8 by changing the positions of the ground elements. In addition, the voltage corresponding to the car spacing between the lead car to the following car is impressed on the conductive segments. It is also possible to impress an additional signal for controlling the speed of the lead car. Furthermore, while it is preferable in the embodiment of FIG. 8 to detect the car spacing using the above described analogue system, the digital system using counters, also described above, can alternatively be used.

Many further modifications and variations of the present invention are also possible. For example, the ground elements can be photoelectric switches instead of the semiconductor magnetic proximity switches. In this case, the car element 8 is preferably a light blocking plate. Also, the car itself can act as the car element.

Although it is preferable to use a non-contacting system for sensing the relationship between the car element and the ground element, it is possible to use a brush or contacting system.

A loop antenna can be used instead of the conductive segments $F_i$. In this case, a signal current having a frequency corresponding to the digital output value is fed to the antenna instead of the analogue voltage of the DA converter, and is received by a coil antenna provided on the car. When the speed of the car is not continuously controlled or fixed, as in a five stage control system, the speed can be controlled using five different frequencies.

The speed control of the car can be an open loop control, such as a notch control, instead of the feedback control using the speed dynamo, as shown in FIG. 1, for example.

In general, the controlling apparatus according to this invention is quite effective for use with passenger cars or trucks, and can be applied to vehicles operating in cities and suburbs and to vehicles for transferring cargo within factories. The system can also be used to control other types of vehicles such as electric locomotives, electric trains and a wide range of other types of vehicles.

Using the system of the present invention it is also possible to provide more dense running conditions by calculating the differential value of the voltage impressed on the conductive segments, detecting the speed of the lead car and communicating information corresponding to the car spacing and the speed of the lead car to the following car.

In accordance with the present invention, a fail-safe system is provided wherein the presence of cars is detected by facing a car element to a ground element to produce a location signal which is stored in a memory. After confirmation of the stored signal, the memory is erased and the positions of following cars are detected. Information as to the position of leading cars is provided to the following cars by the system so that safe control of all running cars can always be maintained.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for controlling a trailing vehicle comprising:
   a plurality of vehicle sensing means placed at specific intervals along a predetermined path for generating a first signal as a leading vehicle passes each of said sensing means,
   a plurality of memory means coupled to said sensing means for storing said first signal,
   transmitting means included in each of said memory means for transmitting a second signal, in response to said leading vehicle passing said memory means, to said memory means previously passed by said leading vehicle,
   signal transferring means for transferring information stored in said memory means to said trailing vehicle,
   speed control means in said trailing vehicle for regulating the speed thereof in response to a receipt of said transferred information; and,
   erasing means coupled to each of said memory means for erasing information relating to the passage of said leading vehicle stored in said memory means as said trailing vehicle passes each of said memory means.

2. An apparatus for controlling a vehicle as in claim 1, in:
   a plurality of individually insulated conductive segments placed along said predetermined path, and
   said vehicle sensing means is located along said path in selected positions with respect to said conductive segments.

3. An apparatus for controlling a vehicle as in claim 1, wherein:
   said plurality of memory means includes a plurality of bistable devices; and,
   wherein said transmitting circuit, means includes a resistor, a zener diode and a diode.

4. An apparatus for controlling a vehicle as in claim 1, wherein:
   said plurality of memory means includes a plurality of bistable devices; and
   said transmitting circuit means includes a coupling amplifier and a plurality of resistors connected to said coupling amplifier.

5. An apparatus for controlling a vehicle as in claim 1 wherein:
   said vehicle sensing means include magnetic proximity detectors.

6. An apparatus for controlling a vehicle as in claim 1 wherein:
   said transmitting means includes means for transmitting to various ones of said memory means signals of magnitudes which increase in proportion to the distance between said various memory means and said vehicle.

7. An apparatus for controlling a vehicle as in claim 6, wherein:
said transmitting means includes a counter, and a digital-to-analog converter coupled to said counter.

8. An apparatus for controlling a vehicle as in claim 1, wherein:
said plurality of vehicle sensing means includes a first group of vehicle sensing means separated by a selected distance and a second group of vehicle sensing means separated by distance which is greater than said selected distance.

9. An apparatus for controlling a vehicle as in claim 8, further comprising:
junction means located between said first and second groups of vehicle sensing means for controlling said vehicle as it passes from said first to said second group of vehicle sensing means.

10. An apparatus for controlling a vehicle as in claim 9, wherein:
said junction means includes a plurality of auxiliary vehicle sensing means located between said first and second groups of vehicle sensing means.

* * * * *